(12) United States Patent
Chi et al.

(10) Patent No.: US 6,817,759 B2
(45) Date of Patent: Nov. 16, 2004

(54) METHOD OF ENHANCING SPATIAL RESOLUTION FOR DISTRIBUTED TEMPERATURE MEASUREMENT

(75) Inventors: Sien Chi, Hsinchu (TW); Chien-Chung Lee, Hualien (TW); Po-Wen Chiang, Kaohsiung (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 10/118,019

(22) Filed: Apr. 9, 2002

(65) Prior Publication Data

US 2003/0103552 A1 Jun. 5, 2003

(30) Foreign Application Priority Data

Nov. 30, 2001 (TW) .......................................... 90129694 A (51) Int. Cl.[7] .......................... G01K 3/00; G01K 11/32
(52) U.S. Cl. ........................ 374/137; 374/161; 374/131
(58) Field of Search .................................. 374/137, 161, 374/131, 117; 356/44, 301, 73.1; 702/130, 134

(56) References Cited

U.S. PATENT DOCUMENTS

| | | | | |
|---|---|---|---|---|
| 4,673,299 A | * | 6/1987 | Dakin ........................ | 374/131 |
| 4,767,219 A | * | 8/1988 | Bibby ........................ | 374/131 |
| 4,823,166 A | * | 4/1989 | Hartog et al. ................. | 356/44 |
| 4,997,277 A | * | 3/1991 | Horiguchi et al. ......... | 356/73.1 |
| 5,096,277 A | * | 3/1992 | Kleinerman ................. | 385/12 |
| 5,383,207 A | * | 1/1995 | Culverhouse et al. ......... | 356/43 |
| 5,686,986 A | * | 11/1997 | Li et al. .................... | 356/73.1 |
| 5,825,804 A | * | 10/1998 | Sai ............................. | 374/137 |
| 6,542,228 B1 | * | 4/2003 | Hartog ...................... | 356/73.1 |
| 2003/0007142 A1 | * | 1/2003 | Hotate et al. .............. | 356/73.1 |

FOREIGN PATENT DOCUMENTS

| | | | | |
|---|---|---|---|---|
| EP | 0502283 A1 | * | 9/1992 | ................. 374/117 |
| EP | 0907073 A1 | * | 4/1999 | .......... G01M/11/00 |
| GB | 2230086 A | * | 10/1990 | ................. 374/159 |
| JP | 01140031 A | * | 6/1989 | ................. 374/131 |
| JP | 02134524 A | * | 5/1990 | ................. 374/117 |
| JP | 02201129 A | * | 8/1990 | ................. 374/117 |
| JP | 02201233 A | * | 8/1990 | ................. 374/117 |

OTHER PUBLICATIONS

Chi, S. et al., "Measurement of Stimulated–Brillouin–Scattering Thresholds for Various Types of Fibers Using Brillouin Optical–Time–Domain Reflectometer", Lasers and Electro–Optics (CLEO 2000), 2000, pp. 305–306.*

(List continued on next page.)

*Primary Examiner*—Christopher W. Fulton
*Assistant Examiner*—Mirellys Jagan
(74) *Attorney, Agent, or Firm*—Rosenberg, Klein & Lee (57) ABSTRACT

A method that utilizes a short sampling interval and a long-pulsewidth laser source to obtain the long sensing range and employs a signal processing technique of decomposing Brillouin spectrum to achieve high spatial resolution, high temperature resolution of the distributed temperature measurement is disclosed. The present method includes the steps of measuring the Brillouin spectra of an optical pulse applying to a sensing fiber and a overlapped area thereof, determining the length that the pulse enters according to the measured Brillouin spectra and a weighting factor and then determining a real Brillouin spectrum profile and a temperature distribution according to Brillouin frequency shifts thereof. For a 9500-m sensing range of standard single-mode fiber and a 100-ns pulsewidth laser source, spatial and positon resolutions of 20 cm and a temperature resolution of 1° C. are simultaneously achieved by using this signal processing method.

13 Claims, 6 Drawing Sheets

OTHER PUBLICATIONS

Everard, J.K.A. et al., "Coherent Detection of Stimulated Brillouin Backscatter on Photoconductive Three–Wave Mixer for Sensing Applications", Electronics Letters, vol. 25, Issue 18, Aug. 31, 1989, pp. 1236–1237.*

Ghogomu, N.N. et al., "Coherent Photoconductive Detection of Brillouin Scattering for Temperature Sensing", Electronics Letters, vol. 31, Issue18, Aug. 31, 1995, pp. 1606–1607.*

M. De Merchant, et al., "Structural Monitoring by Use of a Brillouin Distributed Sensor," *Applied Optics*, vol. 38, No. 13, pp. 2755–2759, May 1999.

H. H. Kee, et al., "Technique for Measuring Distributed Temperature with 35–cm Spatial Resolution Utilizing the Landau–Placzek Ratio," *IEEE Photonics Technology Letters*, vol. 12, No. 7, pp. 873–875, Jul. 2000.

T. Kurashima, et al., "Performance Improvement of a Combined OTDR for Distributed Strain and Loss Measurement by Randomizing the Reference Light Polarization State," *IEEE Photonics Technology Letters*, vol. 9, No. 3, pp. 360–362, Mar. 1997.

A. W. Brown, et al., "Spatial Resolution Enhancement of a Brillouin–Distributed Sensor Using a Novel Signal Processing Method," *Journal of Lightwave Technology*, vol. 13, No. 7, pp. 1179–1183, Jul. 1999.

T. Horiguchi, et al., "Development of a Distributed Sensing Technique Using Brillouin Scattering," *Journal of Lightwave Technology*, vol. 13, No. 7, pp. 1296–1302, Jul. 1995.

* cited by examiner

METHOD OF ENHANCING SPATIAL RESOLUTION FOR DISTRIBUTED TEMPERATURE MEASUREMENT

BACKGROUND OF THE INVENTION

1. Field of Invention

The present invention relates in general to a distributed temperature sensing method based on the spontaneous Brillouin scattering effect, more particular, to a spectrum decomposing method to achieve high spatial resolution, high temperature resolution and long sensing range of the distributed temperature measurement.

2. Description of Related Art

There are two ways to fulfill the distributed sensing approach. One includes the use of single sensors being discretely arranged along a sensing line, but will make the whole sensing system much complicated. The other one as described hereinafter includes the use of optical-fiber sensors to obtain the detecting physical parameters along a linear fiber depending upon the optical characteristics thereof. Under the circumstances, the optical fiber are regarded, on one hand, as an active component for sensing measurement and, on the other hand, as a passive component for the information transmitting material to obtain the following advantages:

1. The optical fiber is small in volume and light. Thus, the optical fiber can be adopted easily anywhere.
2. Since the frequency bandwidth of the optical fiber is large, many signals may be transmitted simultaneously.
3. Since the optical fiber is made of nonconductive insulating material, it is not influenced by external electromagnetic waves. Thus, the signal may be transmitted without noise.
4. Due to the development of optical fiber technology, optical fibers can be manufactured at a low cost.

As such, the utilization of fiber-distributed sensing for the measurement of strain and/or temperature distribution is widely applied on many implementations to monitor such as tunnels, bridges, dams and airplanes, buildings and etc. for safety-secured purpose.

Recently, the distributed temperature sensors (DTS's) that use Brillouin scattering as the sensing mechanism have been intensive studied. The Brillouin frequency shift is dependent on the temperature and strain conditions of the optical fiber, which provides the basis for a sensing technique capable of detecting these two parameters. In the Brillouin-based distributed temperature sensing system, if a higher spatial resolution is accomplished, the measured temperature distribution is more closed to the practical situation of the fiber. The sensing spatial resolution is defined as the 10%/90% rise times from the unheated section to the heated section of the fiber. To achieve higher spatial resolution in a Brillouin scattering system, the measurements utilizing a short-pulsewidth laser source have been reported, which are disclosed by T. Horguchi, K. Shimizu, T. Kurashima, M. Taleda, and Y Koyamada, published in *J. Lightwave Technol.*, 13, 1296 (1995), and A. Fellay, L. Thevenaz, M. Facchlni, M. Nikles, and P. Robert, published in *Proc. OSA Tech. Dig.*, 16, 324 (1997). However, owing to the Brillouin linewidth limitation, it is obvious that using the time-domain pulsed approach is unsuitable for distributed measurements of submeter spatial resolution unless other techniques are employed. More recently, several methods have been reported for performing the measurement with submeter spatial resolution. One such technique, disclosed by K. Hotate and T. Hasegawa, published in *Tech. Dig. Opt. Fiber Sens.*, 17, 337(1999), is the direct-frequency modulation method that demonstrated a sensing spatial resolution of 45 cm over 7.8 m sensing range, and another techniques, disclosed by M. D. DeMerchant, A. W. Brown, X. Bao, and T. W. Bremner, published in *J. Lightwave Technol.* 38, 2755 (1999), and A. W. Brown, M. D. DeMerchant, X. Bao, and T. W. Bremner, published in *J. Lightwave Technol.* 17, 1179 (1999), utilize the sensing fiber with uniform strain and identical length in each section to achieve the spatial resolution of 40 cm and even 25 cm with the enhancement of compound spectra processing method. In addition, a Brillouin-based distributed temperature sensing system that provide a spatial resolution of 35 cm and a temperature resolution of 4.3° C. over 1 km based on measuring the Landau-Placzek ratio with a pulsewidth of 3.5-ns has also been reported by H. H. Kee, G. P. Lees, and T. P. Newson, *IEEE Photon, Technol. Lett.*, 12, 873 (2000). However, the short-pulsewidth laser sources are requisite for these methods to accomplish measurements of submeter spatial resolution. Thus the sensing ranges of these methods are limited.

SUMMARY OF THE INVENTION

It is therefore, in one aspect, an object of the present invention to provide a method that can provide a distributed temperature measurement with high spatial resolution and long sensing range based on decomposing the spectra of the spontaneous Brillouin scattered signals. This method utilizes a long-pulsewidth laser source to derive the long sensing range and employs a signal processing technique of decomposing Brillouin spectrum to raise the spatial and resolutions to submeter level.

According to the above-mentioned objects of the present invention, the method for distributed temperature measurement based on decomposing spectra of spontaneous Brillouin scattered signals includes: (a) supplying a laser source with an optical pulse to an optical fiber; (b) obtaining a first measured Brillouin spectrum in a reference temperature section of the optical fiber, and at least a second measured Brillouin spectrum and a third measured Brillouin spectrum in a temperature overlapped region of the optical fiber, the measured Brillouin spectra above corresponding to the optical pulse entering a fiber section of the optical fiber with a length of d at a traveling time $t_d$ for $t_i > t_d > t_0$ and a sampling interval $t_1 - t_0$; (c) determining the length of d according to the measured Brillouin spectra above and a weighting factor ranging from 0 to 1; (d) determining a real Brillouin spectrum profile of the fiber section according to the length of d, the corresponding weighting factor and the measured Brillouin spectra above; and (e) determining a temperature distribution according to Brillouin frequency shifts of the real Brillouin spectrum profile.

As a result, a spontaneous Brillouin-based distributed temperature sensing system using a new Brillouin spectrum decomposing technique to achieve high spatial and position resolutions, high temperature resolution and long sensing range. For a 9500-m sensing range of standard single-mode fiber and a 100-ns pulsewidth laser source, a spatial resolution of 20 cm and a temperature resolution of 1° C. are simultaneously achieved by using this signal processing method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given herein below illustration only, and thus are not limitative of the present invention, and wherein.

DETAILED DESCRIPTION OF THE INVENTION

According to the paper discloses by T. Kurashima, M. Taleda, T. Horguchi, and Y Koyamada, published in *IEEE Photon, Technol. Lett.*, 9, 360 (1997), the Brillouin optical-time-domain reflectormeter (BOTDR) can be used to measure the spontaneous Brillouin spectra along an optical fiber from one-end. If the temperature in a fiber section is not uniform, a compound Brilloum spectrum composed of the frequency-domain signals of two sections is observed in the overlapped area where the traveling optical pulse is crossing these two sections. Assuming that an optical pulse enters a fiber section with a length of d at the traveling time $t_d$ and the measured Brillouin spectra, $A(t_i)$ are known for $t_i > t_d > t_0$ ($t_0 = t_1$—sampling interval), the real Brillouin spectrum in this fiber section can be derived by decomposing the measured Brillouin spectra. The subscript, i, represents the sampling sequence of the returned Brillouin scattering lightwave within this fiber section. If the real Brillouin spectrum profile of this fiber section is B, then the relationship between B and $A(t_1)$ can be expressed by $$A(t_0) \cdot (1 - W(t_i - t_d)) + B \cdot (W(t_i - t_d)) = A(t_i) \text{ for } t_i - t_d < d/(c/n), \quad (1)$$

$$A(t_0) \cdot (1 - W(t_i - t_d) + W(t_i - t_d - d \cdot n/c)) + B \cdot (W(t_i - t_d) - W(t_i - t_d - d \cdot n/c)) = A(t_i)$$

$$\text{for } d/(c/n) \leq t_i - t_d \leq \text{pulsewidth}, \quad (2)$$

where c is the velocity of light in a vacuum, n is refraction of index, and $W(t_i - t_d)$, ranged from 0 to 1, is a weighting factor determined by the optical pulse shape and overlap time. Thus $t_d$, d and B can be derived from the above equations by substituting the measured profiles of compound Brillouin spectra in the overlap area. Moreover, the corresponding sensing temperature of this fiber section will be obtained from the change in the Brillouin frequency shift of B. For Example, if the temporal sampling interval of BOTDR is short enough to achieve $t_2 - t_d < d/(c/n)$, then $t_d$ according to Eq. (1), obtained implicitly by $$A(t_0) \cdot \left[ 1 - W(t_2 - t_d) + \frac{W(t_2 - t_d) \cdot (1 - W(t_1 - t_d))}{W(t_1 - t_d)} \right] + A(t_1) \cdot \frac{W(t_2 - t_d)}{W(t_1 - t_d)} - A(t_2) = 0 \quad (3)$$

In addition, Brillouin spectrum profile, B, can be given by $$B = \frac{A(t_1) - A(t_0) \cdot (1 - W(t_1 - t_d))}{W(t_1 - t_d)} \quad (4)$$

Consequently, the sensing temperature of this fiber section is derived from the Bnulouin frequency shift of B. Nevertheless, the sensing spatial resolution that is defined as the 10%/90% rise times from the unheated section to the heated section is independent of the used optical pulsewidth of BOTDR. As a result, a distributed temperature measurement with a high spatial resolution and a long sensing range can be accomplished by using a short sampling interval and a long-pulsewidth laser source based on this signal processing method of decomposing Brillouin spectra.

Figures 1A, 1B:
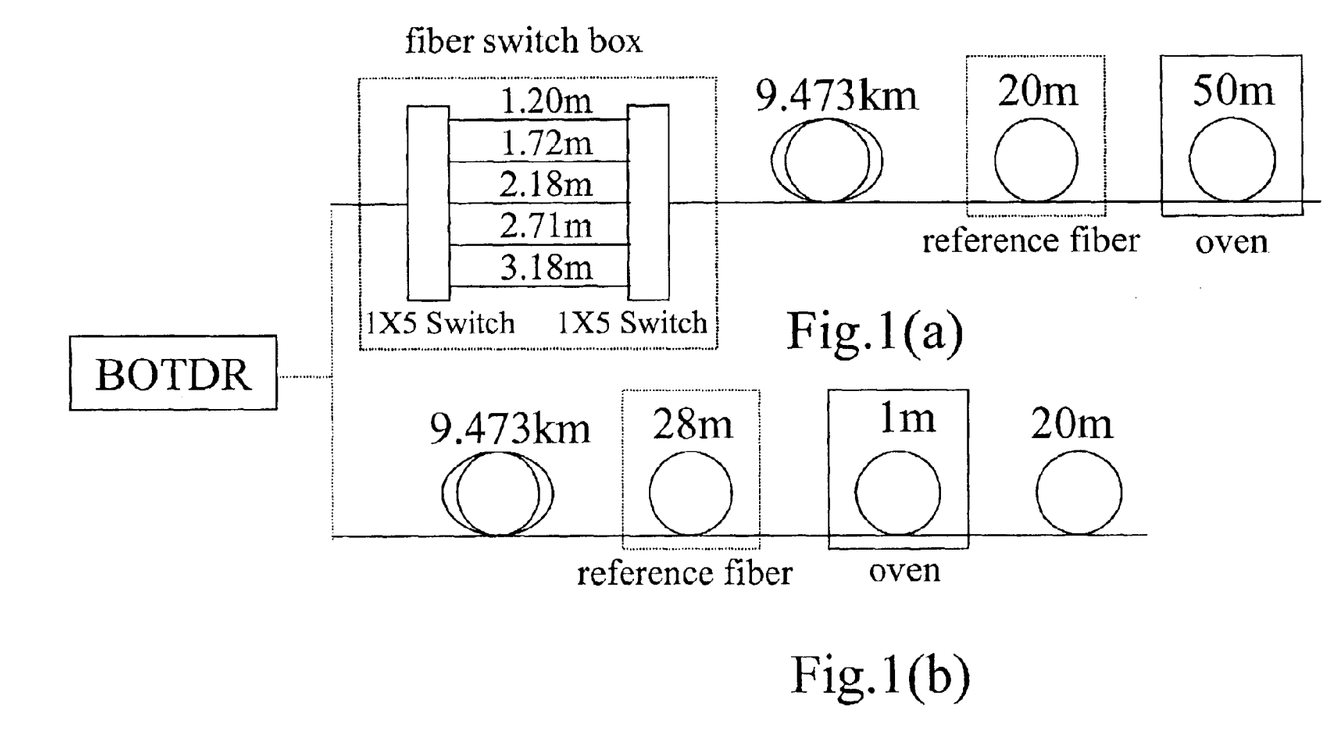
FIG. 1(a) shows an experimental setup for a long-range sensing approach according to the present invention.
FIG. 1(b) shows an experimental setup for a short-range sensing approach according to the present invention.
Figure 2:
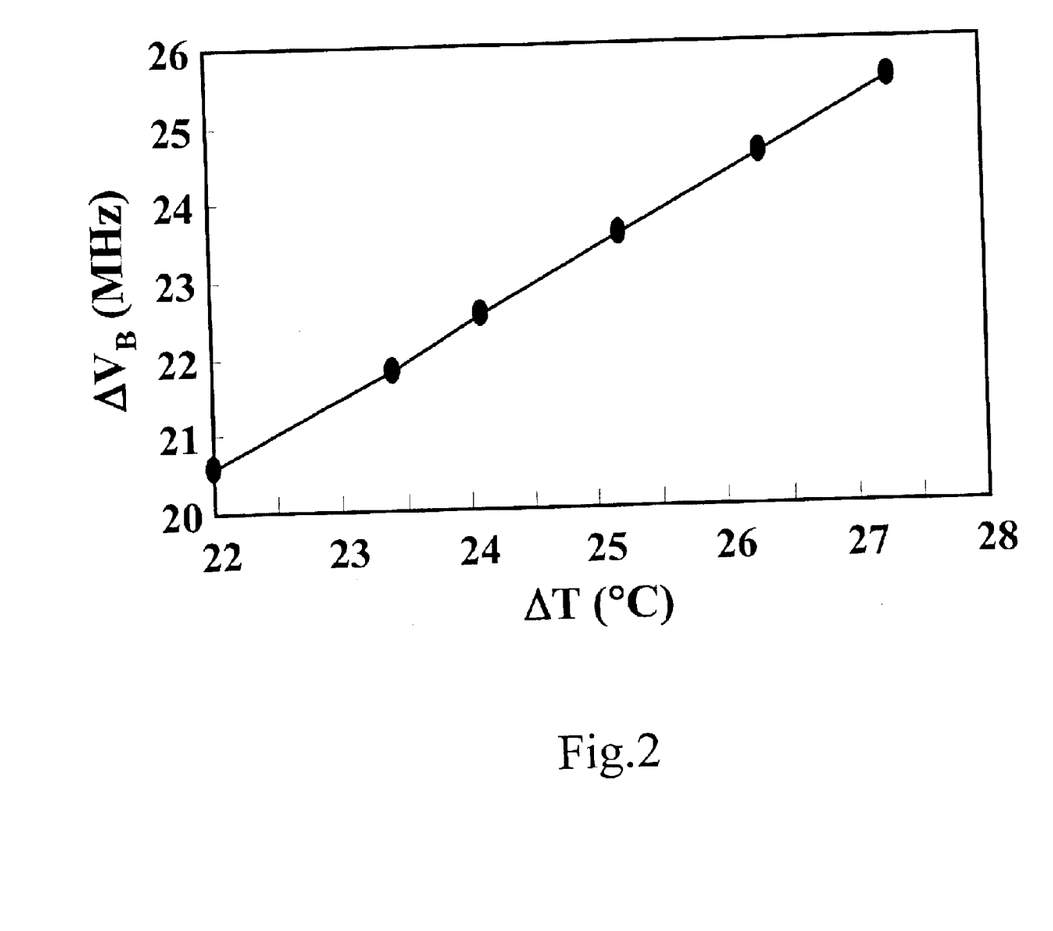
FIG. 2 shows the averaged change in Brillouin frequency shift as a function of temperature change by comparison structure in FIG. 1(a).

FIG. 1 shows the experimental setup. A BOTDR with operating wavelength at 1554-nm is used to measure the spontaneous Brillouin spectra along the length of standard single-mode fiber (SMF). For the temperature measurement, three separate sections of the test SMF and an optical switch box are arranged as shown in FIG. 1(a). The optical switch box, as shown in FIG. 1(a), was composed of a pair of 1×5 optical switches and five fiber paths with lengths of 1.20, 1.72, 2.18, 2.71, and 3.18, respectively. The first 9.473-km SMF remained on the original spool as supplied by the manufacturer, the subsequent 20-m SMF is subject to a low-level tension as a reference section, and the final sensing 50-m SMF is placed in a thermally insulated oven. The operating conditions of BOTDR are as following: output power of 23 dBm, pulsewidth of 100 ns, average times of $2^{15}$, sweep frequency of 5 MHz, and sampling interval of 2m. FIG. 2 is a plot of the averaged change $\Delta v_B$ in Brillouin frequency shift as a function of temperature change ($\Delta T$) by comparing the Brillouin frequency shift of the 50-m sensing SMF with that of the 20-m reference fiber. From these data, the temperature coefficient of the Brillouin frequency shift is determined to be 0.934 MHz/° C. for this SMF. In addition, it can be observed that the temperature resolution is less than 1° C. by using this 50-m sensing SMF.

Figure 3:
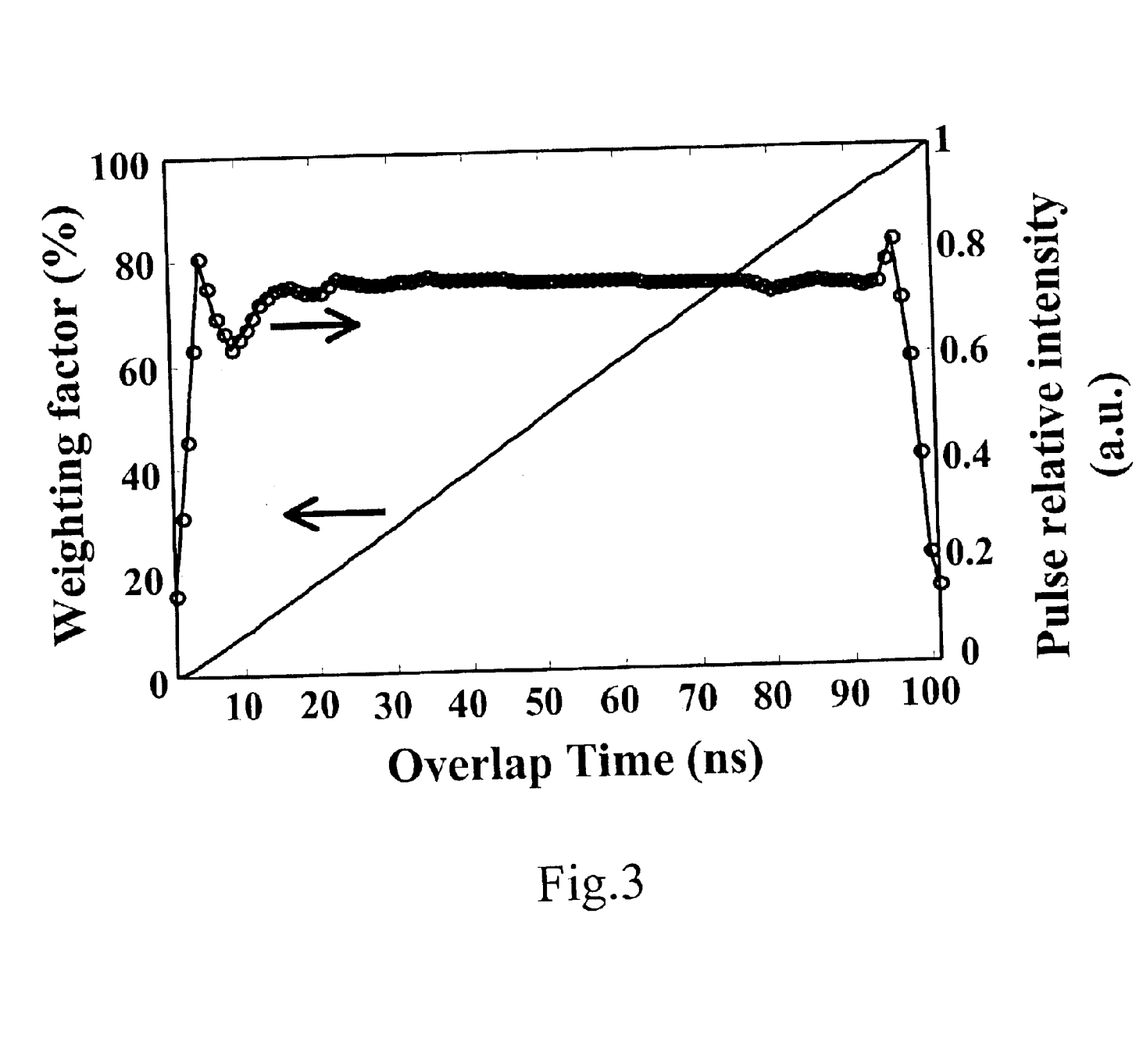
FIG. 3 shows the measured optical pulse shape and the corresponding weighting factor versus the overlap time of the optical pulse and the sensing fiber.
Figure 4:
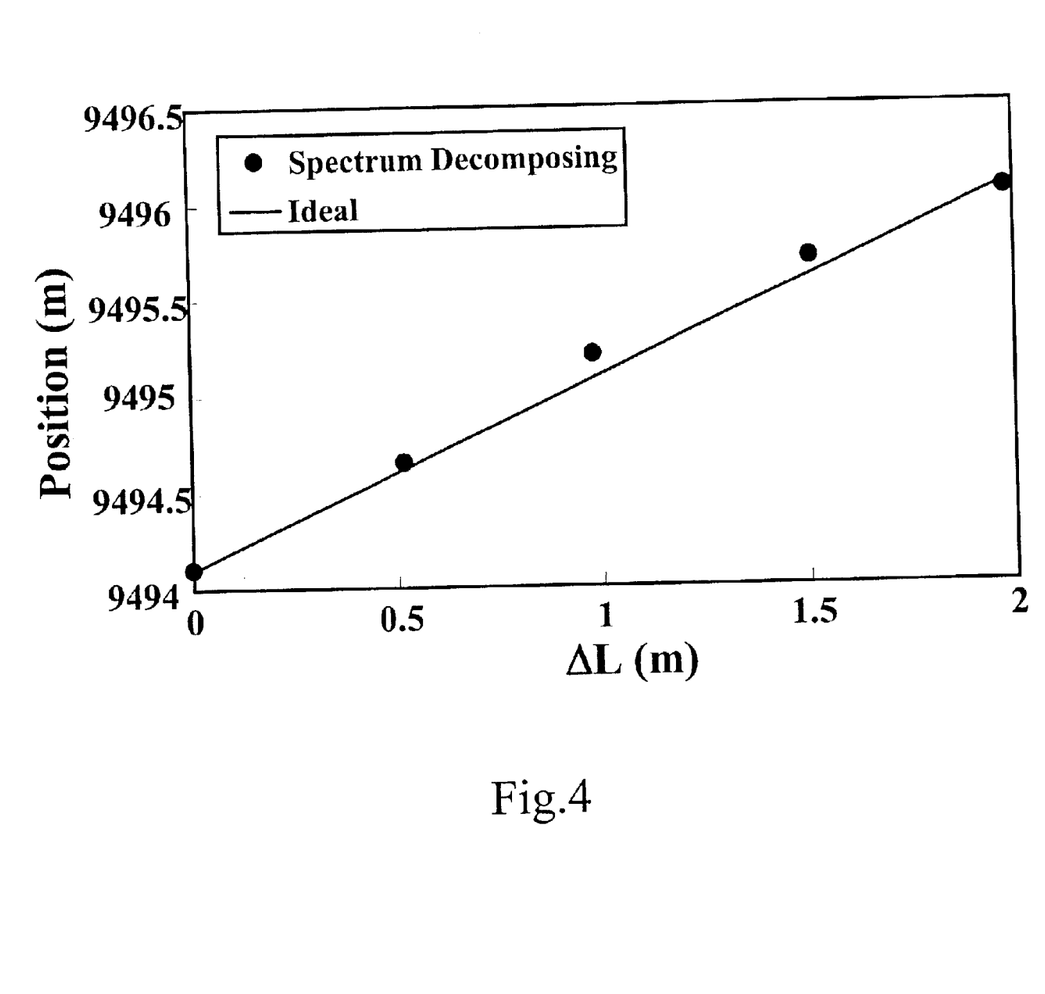
FIG. 4 shows the positions of sensing fiber obtained by the present invention with respect to the ideal one versus the changes.
Figure 5:
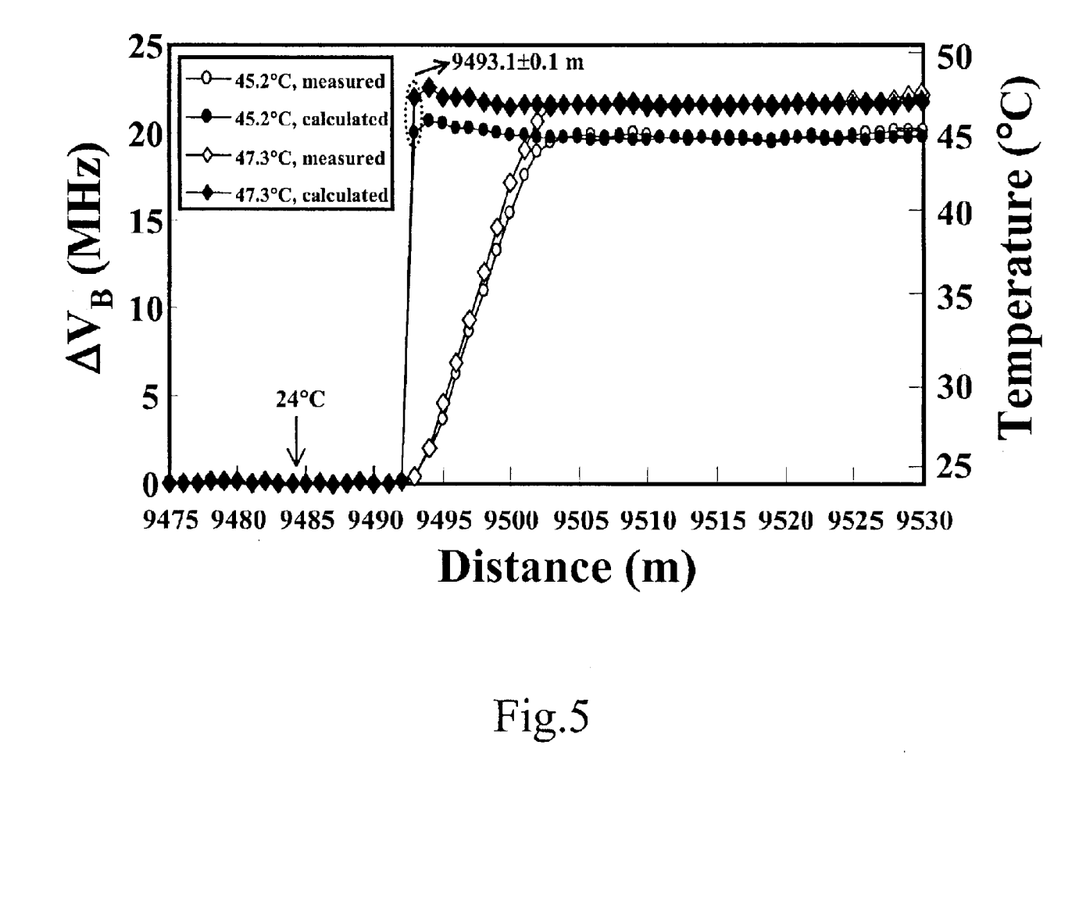
FIG. 5 shows the measured and calculated results of the change in Brillouin frequency shift and the corresponding temperature along the fiber in FIG. 1(a).

FIG. 3 shows the measured optical pulse shape under the BOTDR condition of 100-ns pulsewidth and the corresponding weighting factor, $W(t_i - t_d)$, versus the overlap time, $(t_i - t_d)$, of the optical pulse and the sensing fiber. It is obvious that the optical pulse has a rise/fall time of <5-ns and the weighting factor is presenting a linear relationship to the overlap time when the overlap time is not in the rising and falling region. To verify that the submeter position and spatial resolutions can be achieved for the temperature measurement by using this signal processing method, the condition in this experiment setup was as same as that in the above case of FIG. 1(a) except that the BOTDR parameter of 1-m sampling interval is set. By switching the 1×5 optical switch pair, the changes in the position of 50-m sensing fiber with 50-cm step can be obtained. In addition, the temperature in the oven was set as 45° C. and the room temperature for reference was 22° C. Using the arrangement in FIG. 1(a), the Brillouin spectra in the overlap region of reference fiber and sensing fiber are measured for different fiber paths in the optical switch box; thus, the location of 50-m sensing fiber for each case can be derived by substituting the measured results into Eq. (3). FIG. 4 shows the positions of the 50-m sensing fiber that are derived by using this Brillouin spectrum decomposing method versus the changes, ΔL, in the position of 50-m sensing fiber referred to the 1.20 m fiber path. Also from FIG. 4, it is known that the position error is within ±10 cm. To further confirm that the submeter spatial resolution is achievable, the oven temperature of 45.2 or 47.3° C. and the temperature of24° C. in reference fiber section were set. In addition, the optical switch box is removed. FIG. 5 shows the measured and calculated results of the change Brillouin frequency shift and the corresponding temperature along the fiber. The 10%/90% rise times (also defined as the spatial resolution) from the unheated section to the heated section are measured as 8 m and 8.5 m for oven temperature at 45.2 and 47.3° C., respectively. However, they can be dramatically improved to 20 cm and the corresponding temperature error are within ±0.5° C. as shown in the calculated curves. As a result, a distributed temperature measurement with 20-cm position and spatial resolutions, 1° C. temperature resolution and 9500-m sensing range can be accomplished by using this Brillouin-spectrum decomposing method under the condition of 100-ns pulsewidth laser source.

Figure 6:
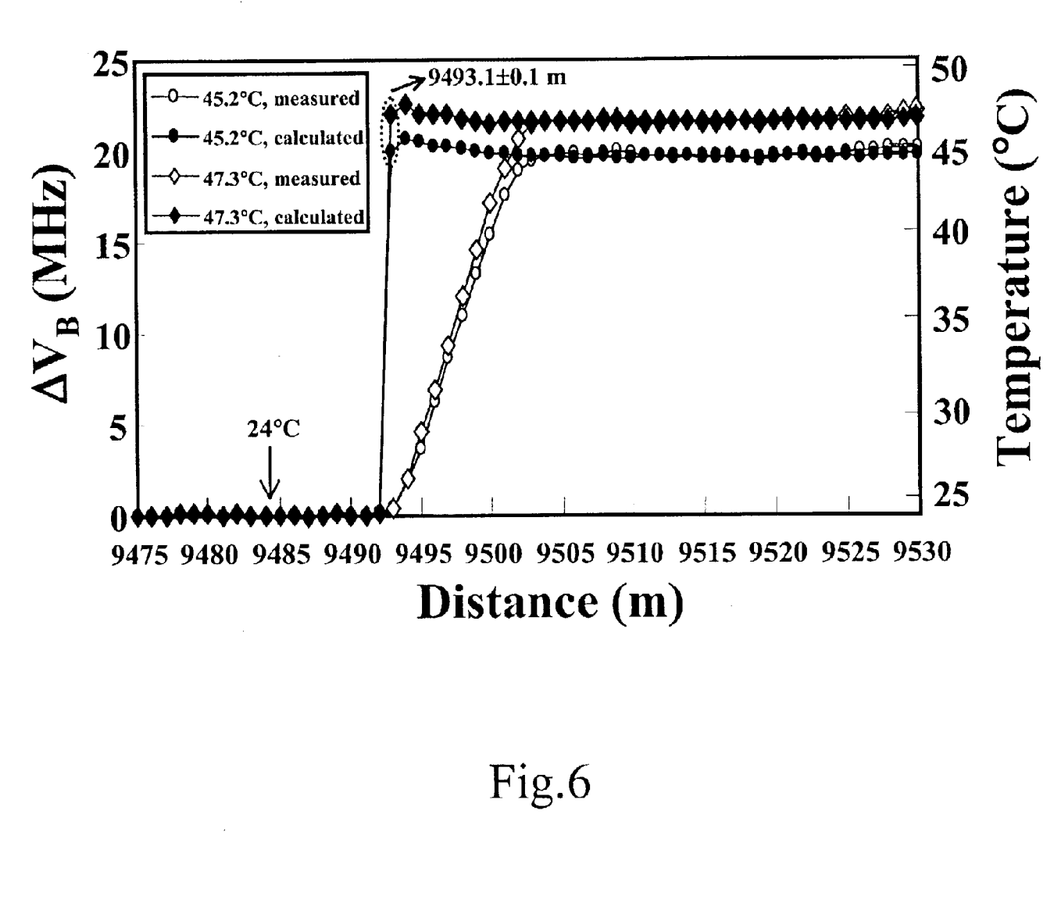
FIG. 6 shows the measured and calculated results of the change in Brillouin frequency shift and the corresponding temperature along the fiber in FIG. 1(b).

To demonstrate the feasibility of this method for the sensing fiber shorter than the product of (c/n) times the optical pulsewidth, the sensing fiber of 1-m is used as shown in FIG. 1(b). In the experimental setup of FIG. 1(b), four separate sections of the test SMF are arranged. Moreover, these four SMF sections are the first 9.473-km SMF remained on the original spool, the subsequent 28-m SMF with low-level tension, the sensing 1-m SMF in the oven, and the final 20-m SMF with low-level tension. The BOTDR parameters are consistent with those in the above experiment. Using this signal processing method, FIG. 6 shows the measured results of the change in Brillouin frequency shift and the corresponding calculated results of temperature along the fiber for oven temperatures at 45.1 and 47.1° C. and reference fiber section at 20° C. for 1-m sensing fiber. After substituting the measured results into Eq. (3) and (4), the positions $(t_d)$ of the 1-m sensing fiber are calculated as 9501.7 and 9501.6 m for over temperatures at 45.1 and 47.1° C., respectively. In addition, the sensing fiber lengths (d) are derived as 1.1 m for over temperature 45.1 and 47.1° C. Also from these calculations, the sensing temperature for oven temperature at 45.1 and 47.1° C. are 45.0 and 47.2° C., respectively. Consequently, the temperature measurement with spatial resolution of 20-m, temperature resolution of 1° C. and sensing range of 9500 m is retrieved by using this Brillouin-spectrum decomposing method under the condition of 100-ns pulsewidth laser source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for distributed temperature measurement, comprising the steps of:

providing a reference fiber and sensing fiber sections of an optical fiber;

supplying a laser source with an optical pulse to the optical fiber and obtaining a first Brillouin spectrum $A(t_0)$ in the reference fiber section of the optical fiber;

obtaining second and third Brillouin spectra $A(t_1)$ and $A(t_2)$ in a temperature overlapped region of the optical fiber sections;

determining a real Brillouin spectrum profile B of the sensing fiber section according to a corresponding weighting factor $W(t_i-t_d)$ determined based on at least part of the measured Brillouin spectra, and selected from a weighting factors chart; and, determining a temperature distribution according to Brillouin frequency shifts of the real Brillouin spectrum profile B.

2. The method as claimed in claim 1, wherein the step of supplying the laser source includes supplying a long-pulsewidth laser.

3. The method as claimed in claim 1, wherein the Brillouin frequency shift in overlapped region of the optical fiber sections is increased by distance increase, and the real Brillouin spectrum profile B is determined using the measured Brillouin spectra $A(t_1)$ and $A(t_2)$.

4. The method as claimed in claim 1, wherein the step of determining a real Brillouin spectrum profile B includes employing the equation:

$$B = \frac{A(t_1) - A(t_0) \cdot (1 - W(t_1 - t_d))}{W(t_1 - t_d)}.$$

5. The method as claimed in claim 1, wherein a temporal sampling interval is short enough to achieve $t_2-t_d<d/(c/n)$, wherein c is the velocity of light in a vacuum and n is an index of refraction of the optical fiber.

6. The method as claimed in claim 1, wherein the weighting factor $W(t_i-t_d)$ is within a range from 0 to 1.

7. A method for distributed temperature measurement based on decomposing spectra of spontaneous Brillouin scattered signals, comprising the steps of:

supplying a laser source with an optical pulse to an optical fiber having a reference fiber section and a sensing fiber section, and obtaining a first Brillouin spectrum $A(t_0)$ in the reference fiber section of the optical fiber;

obtaining second and third Brillouin spectra $A(t_1)$ and $A(t_2)$ in a temperature overlapped region of the optical fiber sections;

determining a weighting factor $W(t_i-t_d)$ with respect to the optical pulse entering the sensing fiber section of the optical fiber according to the Brillouin spectra $A(t_0), A(t_1), A(t_2)$;

determining a real Brillouin spectrum profile B and the Brillouin frequency shift $v_B$ of the sensing fiber section according to the corresponding weighting factor $W(t_i-t_d)$ and at least part of the measured Brillouin spectra $A(t_0), A(t_1), A(t_2)$; and, determining a temperature distribution according to Brillouin frequency shifts $v_B$ of the real Brillouin spectrum profile B.

8. The method as claimed in claim 7, wherein the step of supplying the laser source includes supplying a long-pulsewidth laser.

9. The method as claimed in claim 7, further comprising the step of applying a Brillouin optical-time-domain reflectometer (BOTDR) to measure the Brillouin spectra $A(t_i)$.

10. The method as claimed in claim 7, wherein the real Brillouin spectrum profile B is determined in accordance with the equation:

$$B = \frac{A(t_1) - A(t_0) \cdot (1 - W(t_1 - t_d))}{W(t_1 - t_d)}.$$

11. The method as claimed in claim 7, wherein the weighting factor $W(t_i - t_d)$ is within a range from 0 to 1.

12. The method as claimed in claim 7, wherein the weighting factor $W(t_i - t_d)$ is determined based upon the Brillouin spectra $A(t_0)$, $A(t_1)$, $A(t_2)$ and in accordance with the equation:

$$A(t_0) \cdot \left[ 1 - W(t_2 - t_d) + \frac{W(t_2 - t_d) \cdot (1 - W(t_1 - t_d))}{W(t_1 - t_d)} \right] +$$

$$A(t_1) \cdot \frac{W(t_2 - t_d)}{W(t_1 - t_d)} - A(t_2) = 0.$$

13. The method as claimed in claim 12, wherein a temporal sampling interval is short enough to achieve $t_2 - t_d < d/(c/n)$, wherein c is the velocity of light in a vacuum and n is an index of refraction of the optical fiber.

* * * * *